Oct. 31, 1950  L. A. LEIFER  2,528,442
POWER CHUCK

Filed March 15, 1945  8 Sheets-Sheet 1

INVENTOR.
Lorenz Albert Leifer
BY
ATTORNEY.

Oct. 31, 1950 L. A. LEIFER 2,528,442
POWER CHUCK
Filed March 15, 1945 8 Sheets-Sheet 3

INVENTOR.
Lorenz Albert Leifer
BY Elwin A. Andrus
ATTORNEY.

Oct. 31, 1950     L. A. LEIFER     2,528,442
POWER CHUCK

Filed March 15, 1945     8 Sheets-Sheet 4

INVENTOR.
Lorenz Albert Leifer
BY
ATTORNEY.

Oct. 31, 1950

L. A. LEIFER 2,528,442

POWER CHUCK

Filed March 15, 1945

INVENTOR.
Lorenz Albert Leifer

BY
ATTORNEY.

Oct. 31, 1950 L. A. LEIFER 2,528,442
POWER CHUCK

Filed March 15, 1945 8 Sheets-Sheet 6

INVENTOR.
Lorenz Albert Leifer
BY
ATTORNEY.

Oct. 31, 1950     L. A. LEIFER     2,528,442

POWER CHUCK

Filed March 15, 1945     8 Sheets-Sheet 7

*INVENTOR.*
Lorenz Albert Leifer
BY
*ATTORNEY*

Oct. 31, 1950     L. A. LEIFER     2,528,442
POWER CHUCK

Filed March 15, 1945     8 Sheets-Sheet 8

INVENTOR.
Lorenz Albert Leifer
BY
ATTORNEY.

Patented Oct. 31, 1950

2,528,442

UNITED STATES PATENT OFFICE 2,528,442

POWER CHUCK

Lorenz Albert Leifer, Madison, Wis., assignor to Gisholt Machine Company, Madison, Wis., a corporation of Wisconsin Application March 15, 1945, Serial No. 582,833

13 Claims. (Cl. 279—4)

This invention relates to a power chuck having radially movable jaws for gripping and holding workpieces on rotating or stationary spindles of lathes, boring machines, automatic chucking machines and the like.

Power chucks heretofore employed for this purpose have generally been of the type employing levers for operating the jaws and an axially movable operating rod for the levers. Such chucks require hollow spindles for receiving the operating rod and are not usable where the workpiece is long and must pass through the center of the spindle. Furthermore, they are usually limited in jaw movement.

Scroll and cam ring types of chucks have longer jaw movements and have the advantage that they can be built to large diameters and provide free access to a hollow spindle so that the workpiece can extend through the spindle. Heretofore, chucks of this latter type were usually operated by hand wrenches, although power wrenches and variously powered gear drives have been used. Hand wrench operation is slow and conducive to operator fatigue. Power chuck wrenches require accurate positioning of the chuck relative to the wrench device, which in the case of large chucks holding heavy workpieces requires considerable time and operator effort. Geared chuck drives have been subject to drive-back when the spindle or cutter is rotated.

This has limited the allowable speed of spindle rotation, the maximum chuck size, the chucking force obtainable, and the speed of chucking so that an improvement in any one of these features could be made only at the expense of one or more of the others. None of the chucks of this character have provided accurate means of controlling the gripping forces to prevent distortion of the workpiece.

Attempts to operate cam ring chucks by differential gears driven by power means separate from the spindle have resulted heretofore in loss of operating time due to the requirement for high gear ratios in order to obtain the necessary chucking forces and have not avoided drive-back.

One of the principal objects of the present invention is to provide a power chuck of the scroll or cam ring type combining the advantages of ease and rapidity of operation without the previous drawbacks referred to above.

Another object of the invention is to provide a power chuck of the scroll or cam ring type having a plurality of selected speeds of operation giving a rapid traverse operation for the chuck jaws and a separate power feed operation for the jaws.

Another object is to provide for the more rapid operation of scroll and cam ring chucks.

Another object is to provide a chuck having greater jaw travel without loss of chucking time.

Another object is to operate the jaws from an external rotary member, leaving the chuck and spindle free axially thereof for receiving a workpiece.

Another object is to provide power operation of a chuck of the class referred to and to regulate the gripping pressure upon the workpiece to suit work of different wall thicknesses, by adjusting the stalling torque of the power drive.

Another object is to provide a chuck of the type referred to with predetermined equal gripping forces for each successive chucking operation.

Another object is to prevent drive-back when the chuck is mounted on a rotary spindle or the like so that neither the maximum speed of rotation, maximum chuck size, chucking speed or gripping power is limited.

Another object is to provide for the use of two chucks spaced apart axially for gripping a long workpiece, and for operation of the chucks from a single common control.

Another object is to provide a simple and efficient control for the chuck which eliminates wear on the parts and leaves the chuck free to turn with the spindle at all times except during operation of the chuck.

Another object is to provide a more compact power drive for a chuck to enable chucking of heavy workpieces at a minimum of overhang from the machine spindle.

Another object is to provide a power actuated scroll chuck or the like wherein the chuck mechanism is standard and the same as that provided for hand operation, so that the major parts of the chuck are susceptible to greater volume of production, thereby effecting economies in manufacture.

Other objects and advantages are set forth hereinafter in the description of an embodiment of the invention illustrated in the accompanying drawings.

Figure 1:
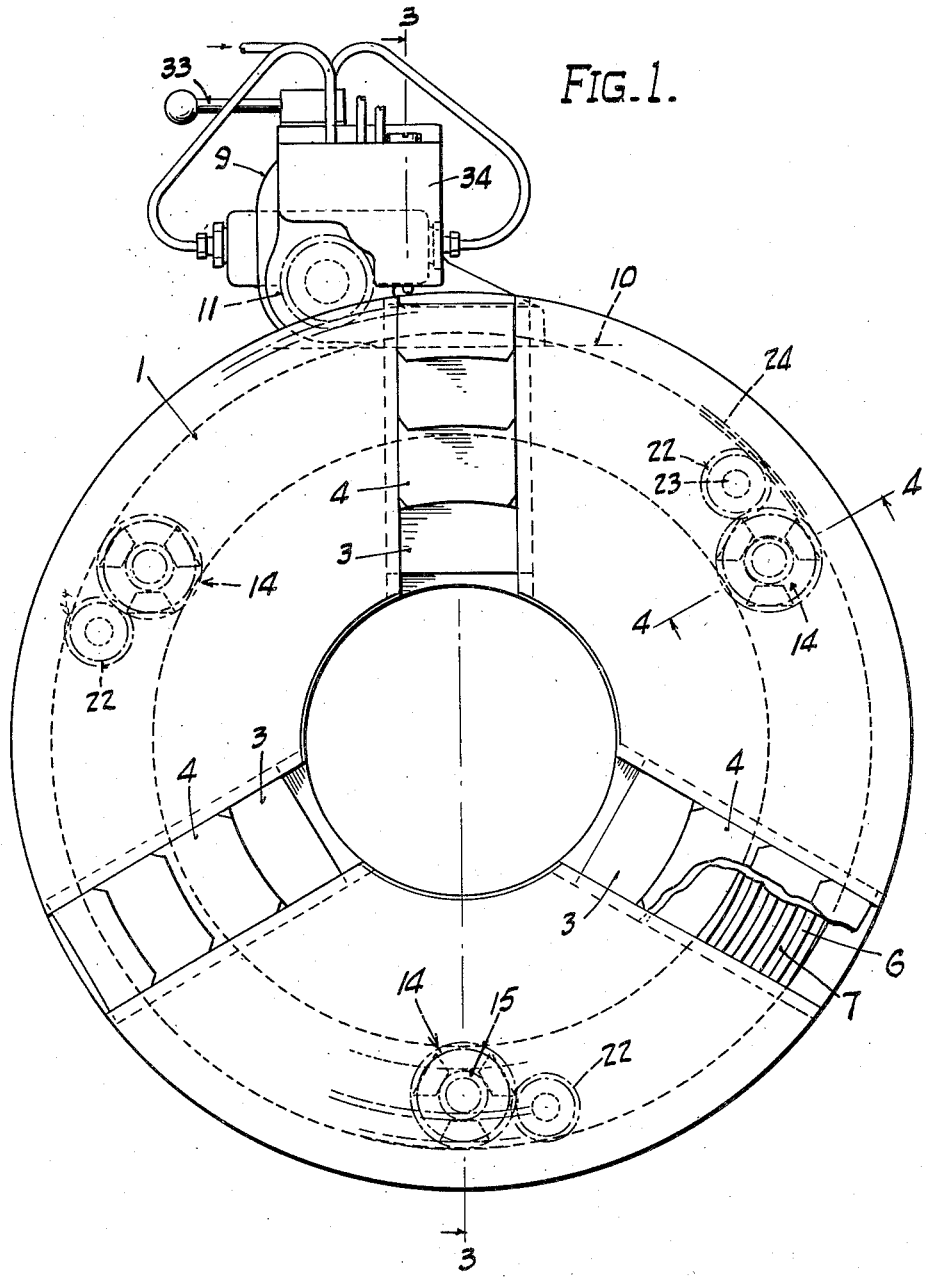
Figure 1 is a front elevation of the chuck.

The chuck illustrated is of the scroll type to give a large jaw movement and provide for a substantial variation in size of workpieces. It is hydraulically driven to provide convenient and rapid control with accurate determination of the clamping forces employed.

The chuck has the usual parts of a scroll chuck, including front plate 1 secured to a two-part back plate 2 and having three radial grooved slots in each of which a jaw base 3 is mounted for radial movement. A jaw 4 is adjustably secured on each jaw base 3. The back plate is bolted to the front flange on the lathe spindle 5 to effect rotation of the chuck with the spindle.

Movement of the jaw bases 3 in their respective grooves is effected by the scroll 6 which constitutes a cam ring setting in a recess in the back of the front plate 1 and adapted to be rotated relative to the rest of the chuck. The scroll ring has a scroll or spiral groove 7 on its front face into which corresponding teeth 8 on the jaw bases mesh. The groove 7, being spiral, effects radial movement of the jaw bases when the scroll 6 is rotated relative to the chuck. The direction of rotation of the scroll 6 determines the direction of movement of the jaw bases 3.

According to the present invention the scroll 6 is rotated relative to the chuck by power means independent of the spindle and applied at any position of the spindle and chuck. In order to provide the varying drive ratios for traverse and final gripping of the jaws, the scroll is driven by a plurality of epicyclic gear trains carried by the chuck body and in turn driven by a pair of differential gears. The driving of the differential gears may be by a single motor or by separate motors for each under a common control, and may be by means of gears, belts, chains or the like or by impact wrenches.

In the present embodiment a motor 9 is mounted on the headstock housing 10 and has a gear 11 or other means splined to its shaft for driving two ring members 12 and 13 encircling the chuck concentric with scroll 6 and which in turn drive the three separate epicyclic gear units 14 providing a differential motion and each of which has a pinion 15 engaging an internal gear in a recess in the rear face of the scroll 6. The pinions 15 constitute the output gears for the corresponding epicyclic gear trains and serve to drive the scroll 6.

Each gear unit 14 comprises a spindle 16 mounted in anti-friction roller bearings 17 in back plate 2 and into which the tapered shank of pinion 15 fits for driving the latter. The spindle 16 is driven by a set of three planetary gears 18 disposed for free rotation on individual radial axles 19 on the spindle. A pair of differential gears 20 and 21 face each other and rotate freely on spindle 16 on opposite sides of the planetary gears 18. The beveled gear faces of gears 20 and 21 mesh with the beveled gears 18 at all times.

Gear 20 is driven by a pinion gear 22 mounted on a pin 23 in a recess in back plate 2 and which in turn is driven by an internal gear 24 on the ring gear 12.

Gear 21 is driven by directly meshing with an internal gear 25 on the ring member 13.

The ring members 12 and 13 are disposed side by side and encircle the entire chuck as a part of its housing. They are disposed for free rotation and supported concentric to the chuck by segments of the back plate between the openings containing the gear units 14. They are held in place longitudinally of the chuck by parts of the back plate 2. The shafts of pinion gears 15 are taper fitted into spindles 16 and are drawn back into the spindles after assembly of the chuck and fitting of the pinion teeth with the internal gear of scroll 6 to prevent any possible binding of the gears.

In the embodiment shown the ring member 12 has an external gear 26 for driving the same from gear 11, and likewise ring member 13 has an external gear 27 for driving the same from gear 11. Both ring members 12 and 13 are thereby driven in the same direction when gear 11 is meshing therewith.

The internal gear 24 on ring member 12 drives its differential gear 20 of each gear unit in the opposite direction of rotation by means of the pinion 22, while internal gear 25 on ring member 13 drives its differential gear 21 of each gear unit directly and in the same direction of rotation as the ring gear. By rotating the gear 20 in the opposite direction from gear 21, and at the same speed, the planetary gears 18 would be rotated equally by each and would not translate around spindle 16 to drive the latter.

In order to rotate spindle 16 to drive scroll 6 through pinion 15 meshing therewith, gears 20 and 21 are either rotated in the same direction, or in opposite directions at different speeds, or one gear is held stationary while the other gear is rotated.

In providing the translation of gears 18 by the differential speeds of gears 20 and 21 in opposite directions various means may be employed to drive gears 20 and 21. Preferably the gears are driven in opposite directions by making the number of teeth in gear 24 a few less than that in gear 25, or vice versa, or by making the number of teeth in external gear 26 a few less than that in gear 27, or vice versa.

The rotation of gears 20 and 21 at different speeds is accomplished by providing less teeth in internal gear 25 than in internal gear 24 so that for every revolution of the ring members 12 and 13 there will be a translation of planetary gears 18 equal to one half the circumferential distance represented by the difference in the number of teeth.

When ring member 13 is held against rotation and only ring member 12 is rotated, or when the ring members are rotated in the opposite direction either at the same or different speeds there will be a more rapid translation of the planetary gears with a resulting more rapid driving of the scroll 6 for traverse purposes.

In one embodiment constructed for chucking large diameter pipe and in which the jaws had a total possible movement of about an inch and a half, the overall gear ratio between gear 11 and scroll 6 was 50:1 when member 13 and its gears 21 were held against rotation. This gave a rapid traverse of the jaws in approaching and receding from clamping position. With a motor 9 of 750 revolutions per minute the scroll turned at 15 R. P. M., and where the pitch of scroll 6 was 0.4″ per turn, the jaws moved at a rate of 6 inches per minute.

The gear ratio for power chucking, when both members 12 and 13 were driven by gear 11 was about 4,350:1, where internal gear 24 had 258 teeth and internal gear 25 had 255 teeth. With the motor 9 running at 750 R. P. M. the jaws traveled at a rate of more than .001 inch per second and a ⅛ horsepower motor could theoretically produce a clamping force of over 100,000 lbs. for each jaw.

Figure 15:
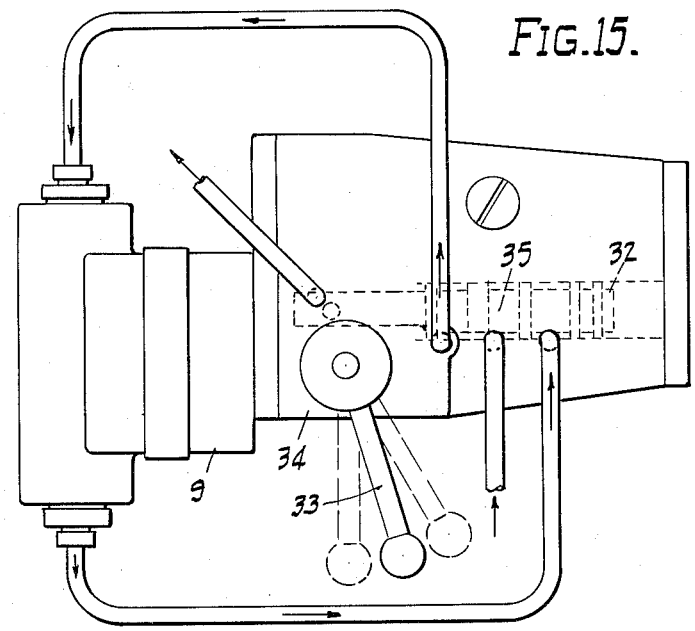
Fig. 15 is a detail view showing the application of power to the fluid motor when the valve and power cylinder are in the positions of Figs. 11 and 12.
Figure 16:
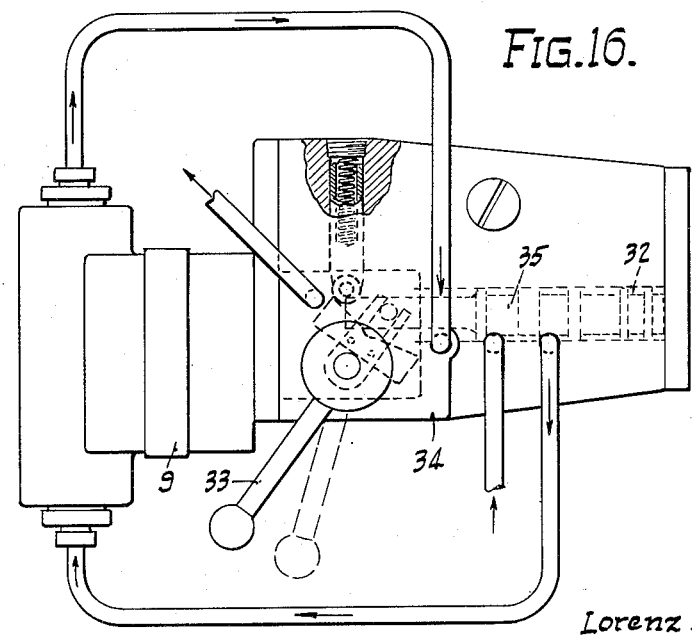
Fig. 16 is a view similar to Fig. 15 showing the application of power to the fluid motor when the valve and power cylinder are in the positions of Figs. 13 and 14.

The motor 9 may be any suitable source of power for driving gear 11 in either direction. In the embodiment illustrated a rotary fluid motor is shown and reversal of gear 11 for either opening or closing the chuck is obtained by reversal of the flow of fluid to the motor as shown in Figs. 15 and 16.

In the construction shown, the operation of the chuck is controlled by shifting gear 11 between a neutral position and either of two operating positions as shown in Figs. 10 to 14. The gear 11 is shifted axially on the motor shaft by means of a fork 28 secured to a piston 29. The piston 29 has its opposite ends extending into power cylinders 30 and 31, respectively, to which pressure fluid is admitted by the control of slide valve 32.

A lever 33 on the control housing 34 moves the slide valve 32 to its respective positions illustrated in Figs. 10 to 14 of the drawings.

Figure 10:
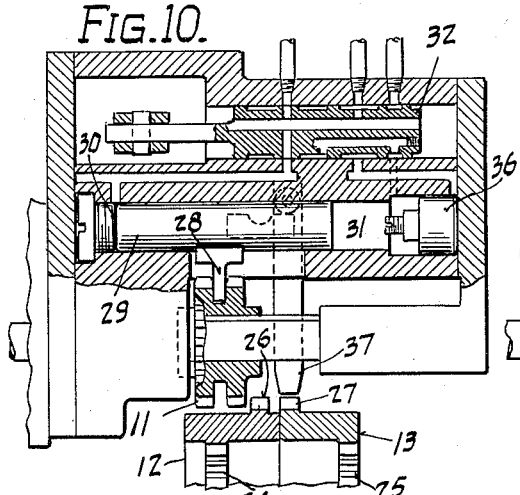
Fig. 10 is a diagrammatic sectional view of the power drive and control valve with the parts in neutral position.

Fig. 10 shows the control in neutral position in which pressure fluid is admitted to the right hand cylinder 31 and drained from the left hand cylinder 30 to hold piston 29 with its gear 11 to the left, where gear 11 is out of contact with external gears 26 and 27 on the chuck. The chuck is then free to rotate with the spindle 5 in the performance of work.

Figure 11:
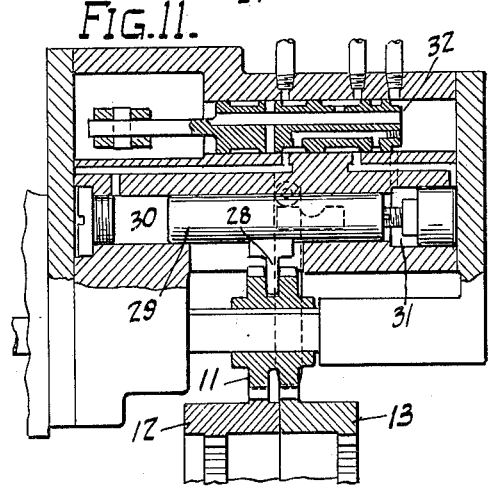
Fig. 11 is a similar view showing the parts in position to effect power opening of the chuck.

Fig. 11 shows the control in position for power opening of the chuck, in which the gear 11 is moved to engage both external gears 26 and 27 to drive the same. In this position the piston 29 is moved to the right as far as possible by admission of fluid pressure to the left-hand cylinder 30, the shifter lever 33 being moved to slide valve 32 to an intermediate left-hand position.

In this position the lever 33 also operates a valve 35 admitting a flow of pressure fluid through motor 9 in the direction indicated in Fig. 15 to effect opening of the jaws to release a workpiece.

Figure 12:
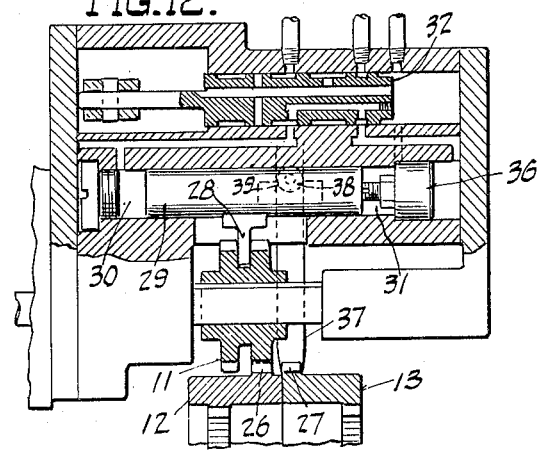
Fig. 12 is a similar view showing the parts in position to effect rapid opening of the chuck.

Fig. 12 shows the control in position to effect rapid opening of the chuck after release of the workpiece. Here lever 33 is operated to move slide valve 32 to its extreme left-hand position to effect the admission of pressure fluid behind an auxiliary piston 36 of larger diameter and which is disposed in a larger bore at the right-hand end of cylinder 31 to move piston 29 leftward to an intermediate position where gear 11 engages only external gear 26 to drive the same.

The external gear 27 is held stationary by a vertical plunger 37 supported by a roller 38 riding on a cam 39 secured to the piston 29. The cam 39 provides a centrally depressed cam track so that when the piston 29 is in position to effect engagement of only external gear 26 by gear 11, the plunger 37 drops into engagement with external gear 27 and holds the latter against turning. When the gear 11 is in either neutral position or in power operating engagement with both external gears 26 and 27, the cam 39 holds plunger 37 in raised position leaving gear 27 free to turn either with spindle 5 or with gear 11.

After the chuck has been opened the desired amount, releasing the lever 33 causes it to be spring returned to the neutral position, previously described. A workpiece may then be removed and a new workpiece inserted, after which the lever 33 is moved to rapid close position illustrated in Fig. 13.

Figure 13:
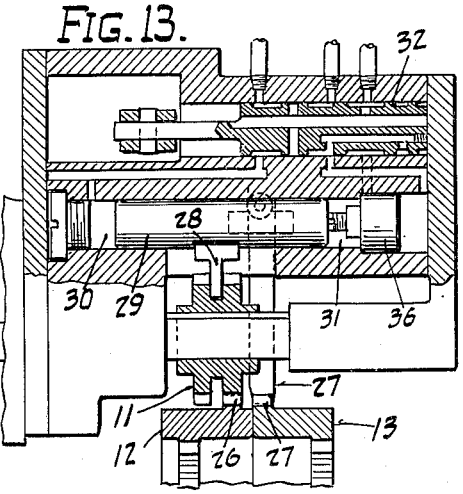
Fig. 13 is a view similar to Fig. 10 showing the parts in position to effect rapid closing of the chuck.

In Fig. 13 the slide valve 32 is disposed to the right of neutral as far as it will go and admits pressure fluid to cylinder 30 and to the right hand end of cylinder 31 behind the auxiliary piston 36 so that piston 29 is held in a central position where gear 11 drives external gear 26 and plunger 37 holds external gear 27 against rotation. The valve 35 is reversed to flow pressure fluid through motor 9 in the opposite direction from that used for opening the chuck, as shown in Fig. 16.

Figure 14:
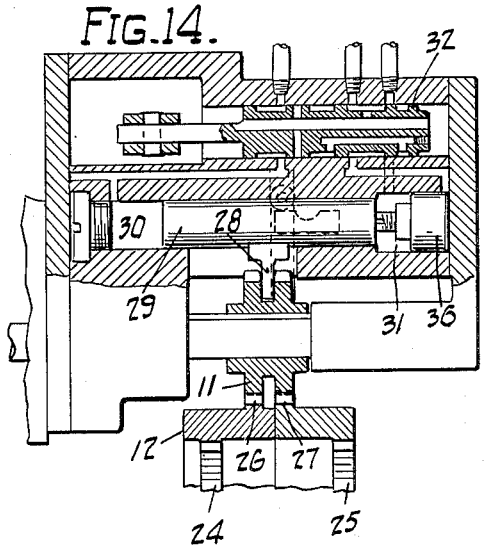
Fig. 14 is a similar view showing the parts in position to effect power closing of the chuck upon a workpiece.

This effects a rapid closing of the chuck until the jaws come nearly in contact with the workpiece, whereupon lever 33 is shifted to the power close position illustrated in Fig. 14.

In Fig. 14 the slide valve 32 is intermediate between central neutral position and the right-hand rapid close position, and it supplies power fluid solely to the cylinder 30 whereby piston 29 is moved to the right and effects engagement between gear 11 and external gears 26 and 27. This forces the jaws 4 into clamping engagement of the work.

Figure 2:
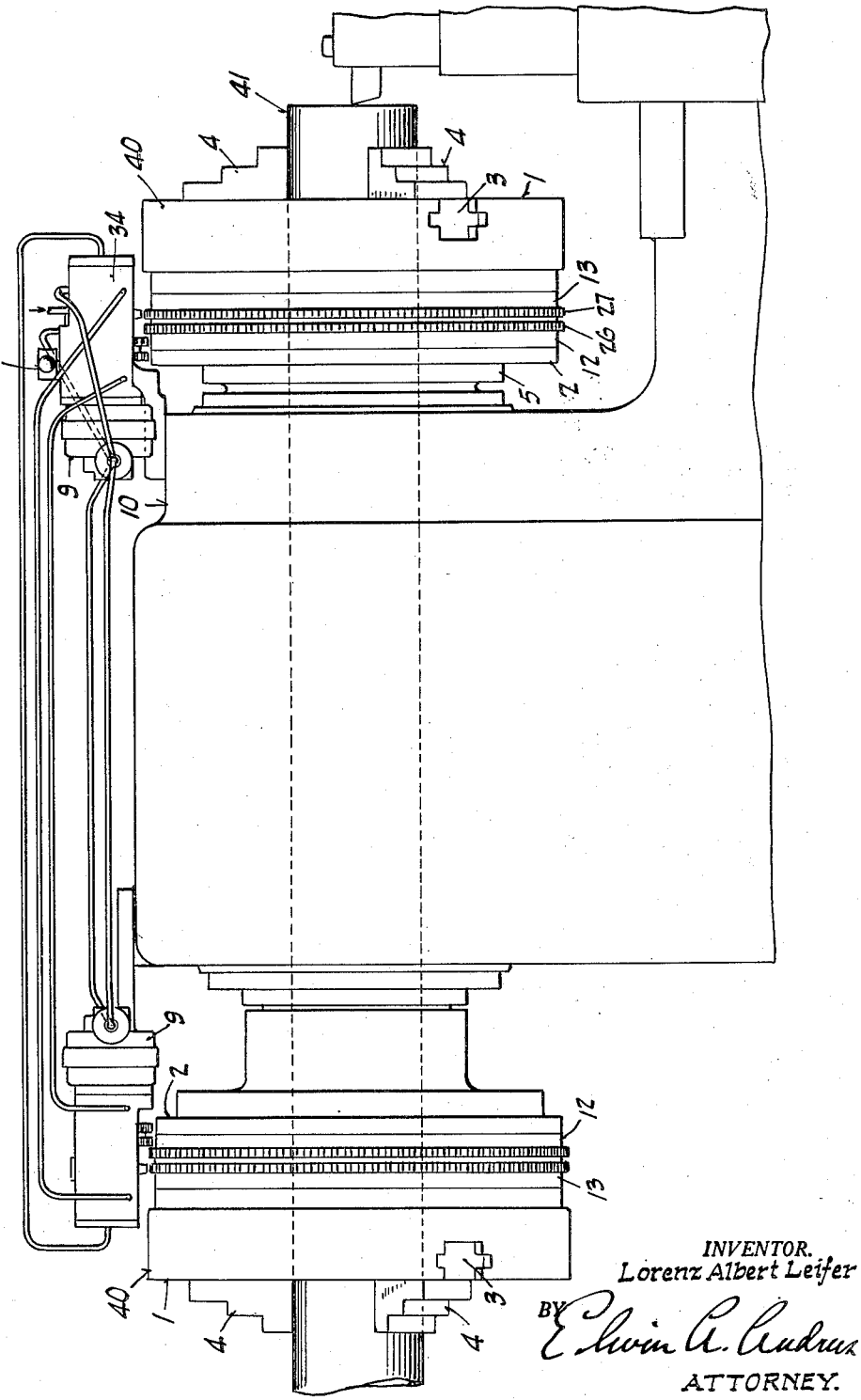
Fig. 2 is a side elevation on a smaller scale of two chucks applied to the opposite ends of a spindle for gripping a long workpiece.
Figure 3:
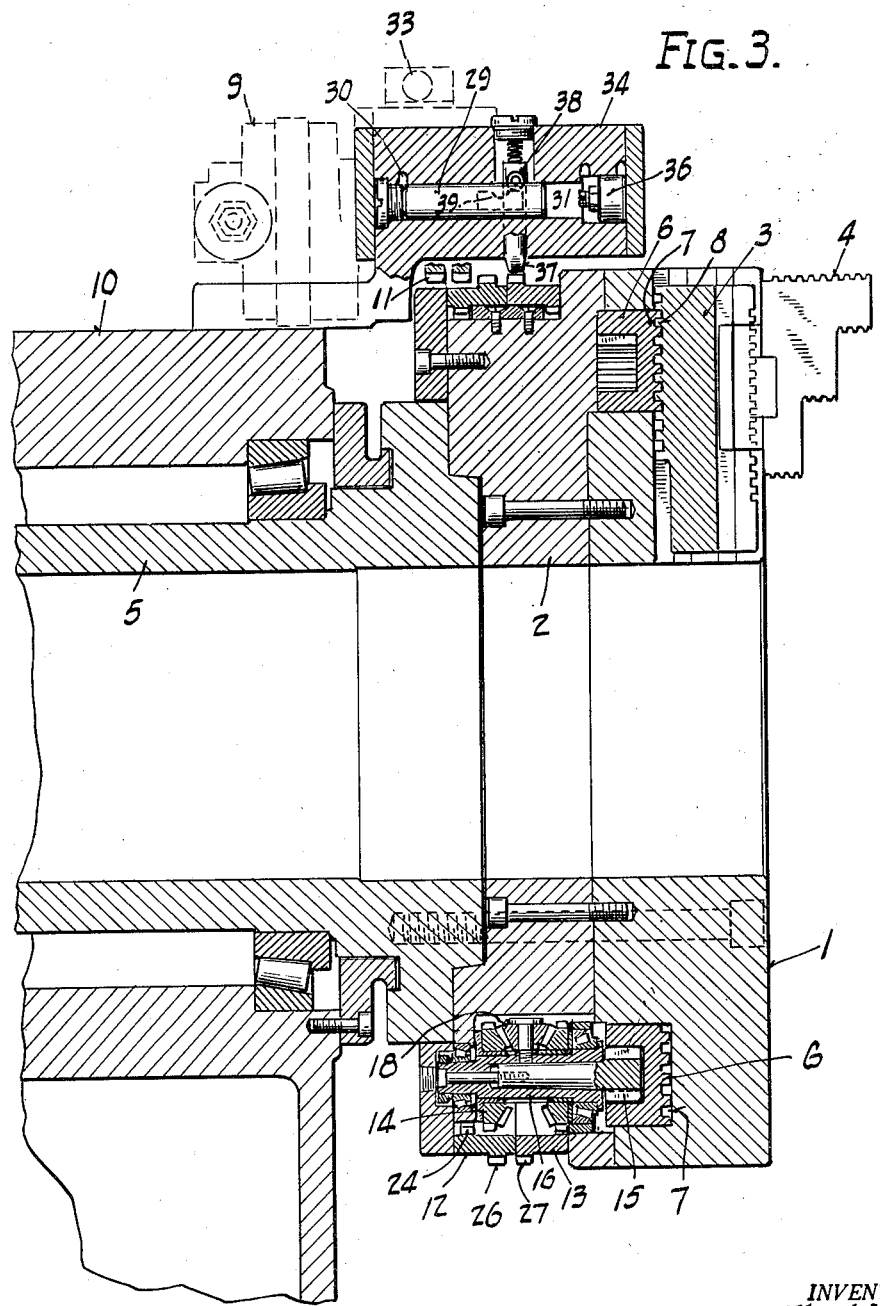
Fig. 3 is an axial section taken on line 3—3 of Fig. 1 showing the chuck mounted on a lathe.
Figure 4:
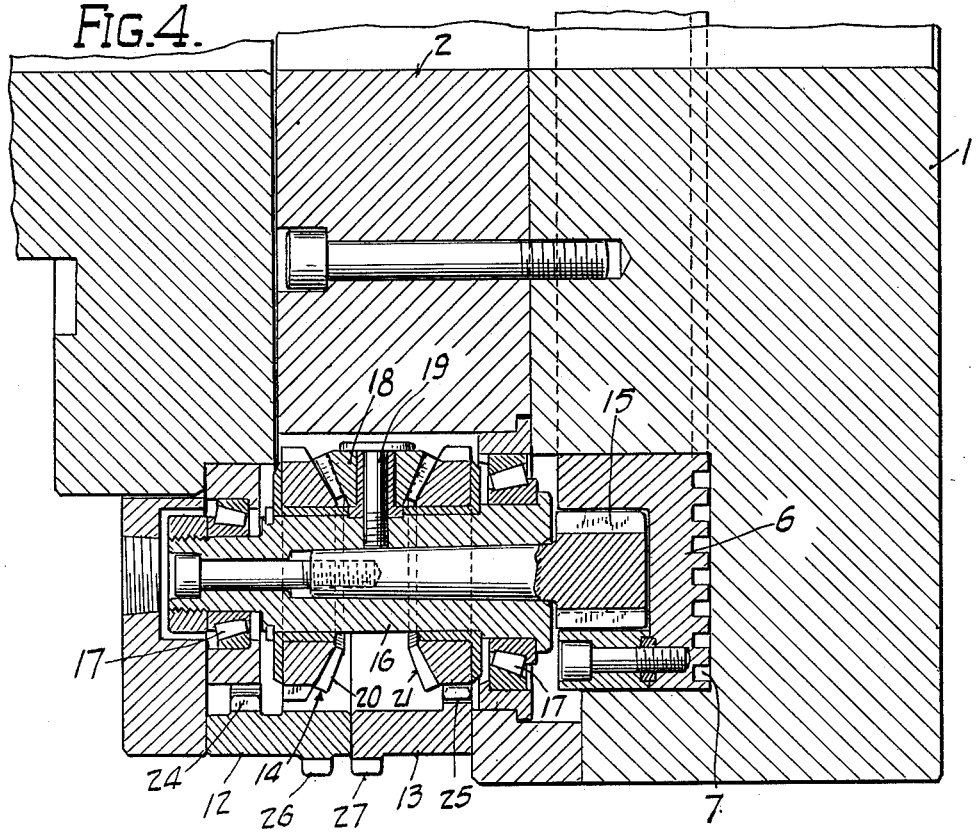
Fig. 4 is an enlarged detail section showing one of the planetary scroll drives, taken on line 4—4 of Fig. 1.
Figure 5:
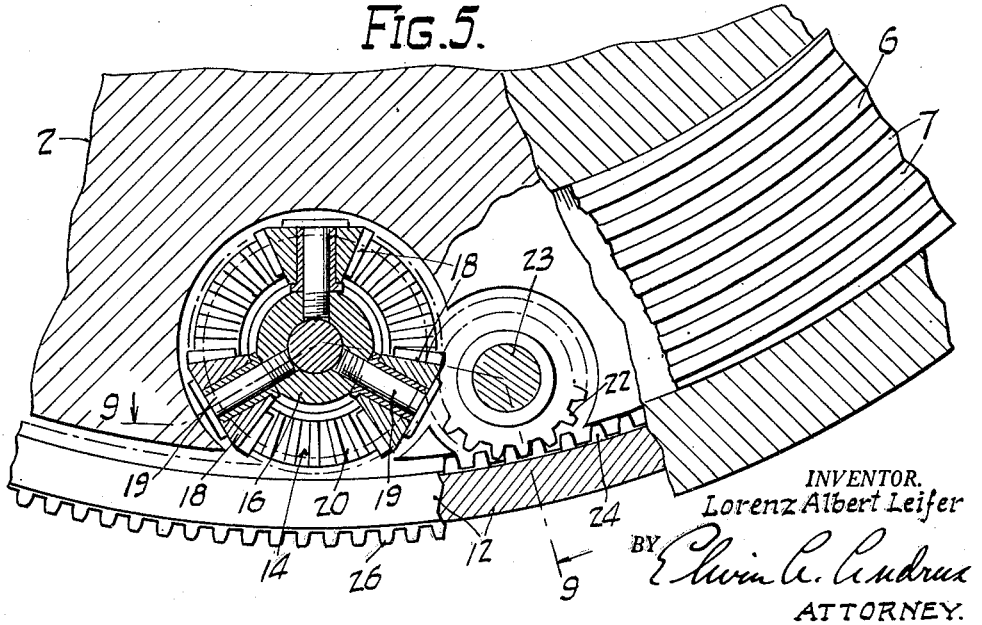
Fig. 5 is a broken section taken at right angles to Fig. 4 and showing a part of the scroll in elevation.
Figure 6:
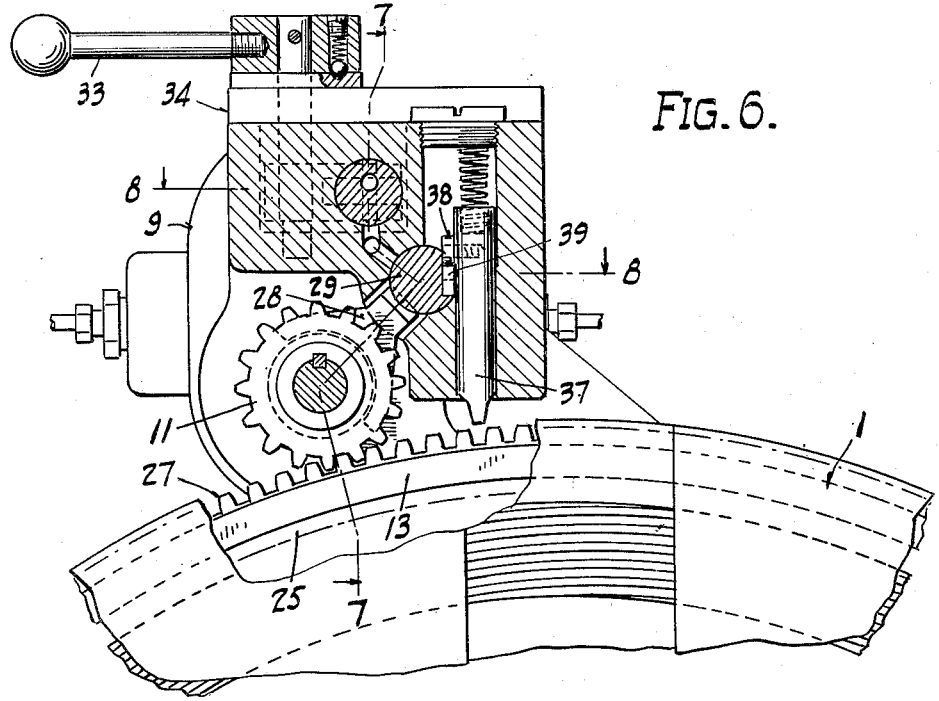
Fig. 6 is an enlarged detail front elevation of the upper part of the chuck and showing the power drive with parts broken away and sectioned.
Figure 7:
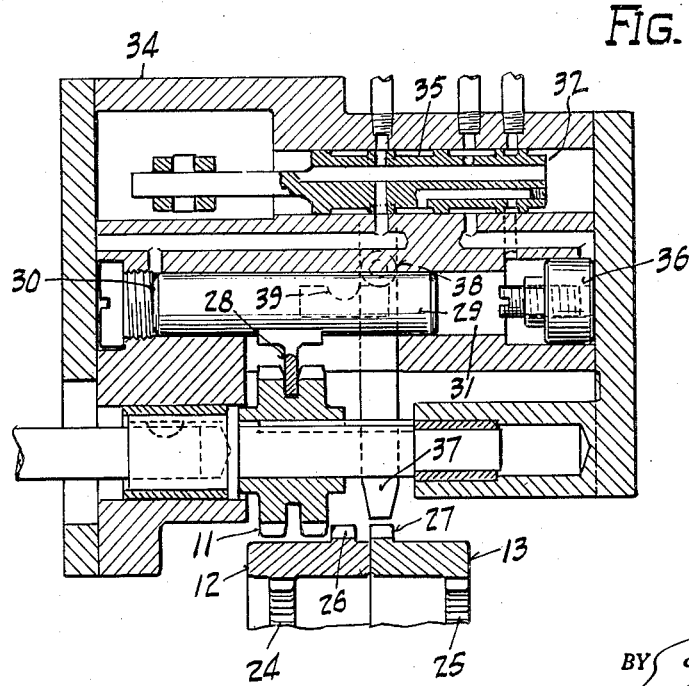
Fig. 7 is a vertical section taken on line 7—7 of Fig. 6.
Figure 8:
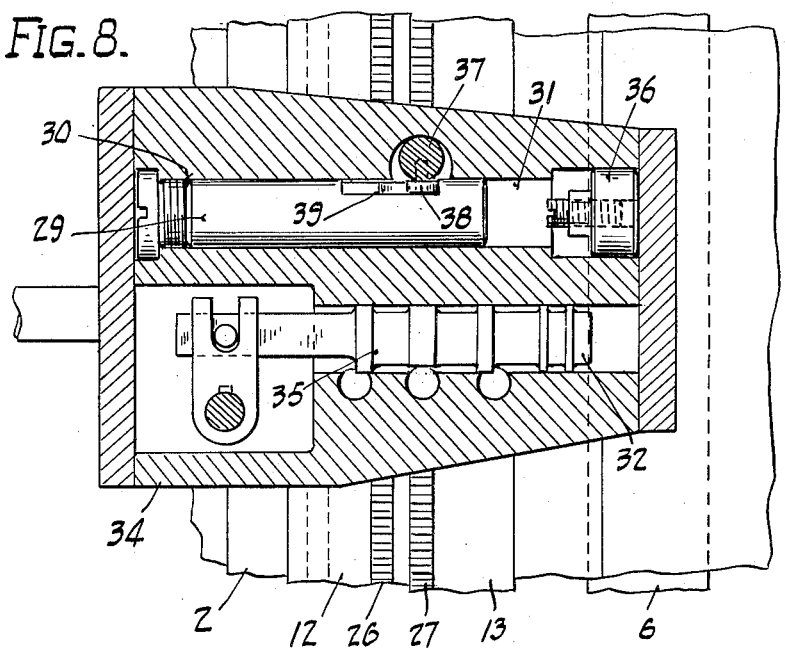
Fig. 8 is a horizontal section taken on line 8—8 of Fig. 6.
Figure 9:
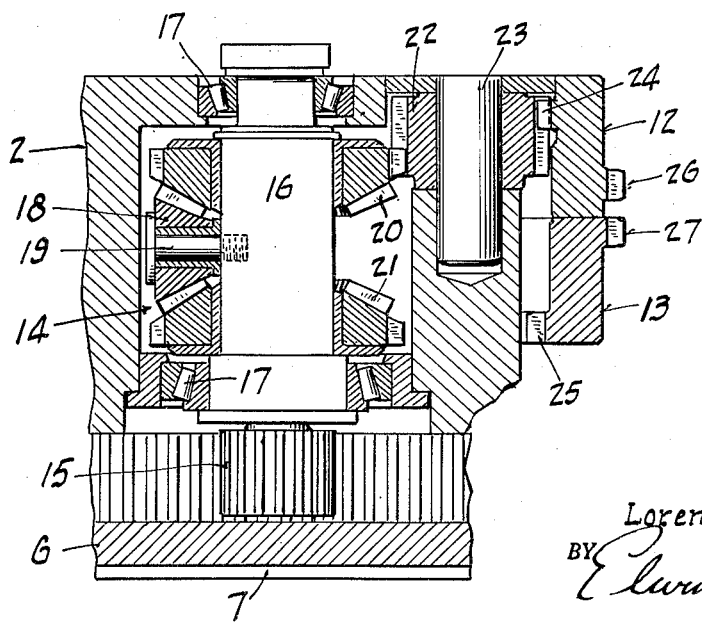
Fig. 9 is a detail section showing the drive pinion for a gear unit taken on line 9—9 of Fig. 5.

After chucking the work as described, the lever 33 is released and moves to the neutral position where slide valve 32 is centered and pressure fluid is admitted to cylinder 31 intermediate piston 29 and auxiliary piston 36. This forces piston 29 to the left to disengage gear 11 from gears 26 and 27 and allow the chuck to turn with spindle 5. At the same time lever 33 operates valve 35 to by-pass all pressure fluid from the motor 9.

Where two chucks 40 are employed, one on each end of the spindle as shown in Fig. 2, they may be operated simultaneously from a common control lever or in sequence from separate adjacent control levers. The same slide valve 32 and motor valve 35 may be employed for both chucks, if desired. Simultaneous operation of the chucks has the advantage that the workpiece 41 is centered and gripped in both chucks simultaneously and there is less chance of the gripping of the workpiece by one chuck interfering with the subsequent centering and gripping of the workpiece by the other chuck.

The operation of the chucks from a common fluid pressure source and control effects equalized clamping pressures between the two chucks irrespective of dimensional tolerances of the workpiece.

The clamping forces employed may be regulated to accommodate either heavy or light workpieces and to prevent distortion of thin pieces by varying the fluid pressure supplied to the motor 9 and thereby altering the stalling torque of the same.

Various embodiments of the invention may be employed within the scope of the accompanying claims.

I claim:

1. In a power chuck of the class described, the combination with a rotary chuck body, a plurality of circumferentially spaced radially movable jaws supported by said body, and a cam ring or scroll member carried by and rotatable relative to the chuck body and connected with said jaws to effect radial movement of the latter by reason of said rotation, of a power drive for said ring member comprising a motor mounted independently of the chuck, at least one spindle mounted for rotation in fixed bearings in said chuck body and geared to said cam ring member to drive the same, a separate epicyclic differential gear train in said chuck body disposed to drive each corresponding spindle and having two separate speed ratios providing selective traverse and feed rates, a pair of ring gears encircling and carried by said chuck body and operatively connected to the corresponding input gears of epicyclic gear train or trains, and means to connect said motor to either or both of said ring gears whereby said gears are driven selectively to provide traverse and feed for the chuck, and to disconnect the motor from said gears and the chuck to provide for rotation of the entire chuck independently of the motor and without drive-back on the ring member.

2. In a power chuck of the class described, the combination with a chuck body, a plurality of circumferentially spaced radially movable jaws supported by said body, and a cam ring or scroll member carried by and rotatable relative to the chuck body and connected with said jaws to effect radial movement of the latter by reason of said rotation, of a power drive for said ring member comprising a plurality of spindles mounted for rotation in fixed bearings in said chuck body and geared to said cam ring to drive the same, said spindles being spaced apart circumferentially of the chuck body, a separate epicyclic gear train in said chuck body driving each of said spindles, and a common differential drive for said epicyclic gear trains.

3. In a power chuck of the class described, the combination with a chuck body, a plurality of circumferentially spaced radially movable jaws supported by said body, and a cam ring or scroll member carried by and rotatable relative to the chuck body and connected with said jaws to effect radial movement of the latter by reason of said rotation, of a reversible power drive for said ring member comprising a plurality of spindles mounted for rotation in bearings in said chuck body and geared to said cam ring to drive the same, said spindles being spaced apart circumferentially of the chuck body, a separate epicyclic gear train in said chuck body driving each of said spindles, and a pair of ring gears disposed concentrically of said cam ring and connected to the corresponding input gears of said epicyclic gear trains to provide a common differential drive for the latter, whereby when both said ring gears are driven a high power feed movement is provided for the chuck jaws and when only one said ring gear is driven a traverse movement of said chuck jaws is obtained.

4. In a power chuck of the class described, the combination with a chuck body, a plurality of circumferentially spaced radially movable jaws supported by said body, and a cam ring or scroll member carried by and rotatable relative to the chuck body and interconnected with said jaws to effect radial movement of the latter by reason of said rotation, of a power drive for said ring member comprising a pair of ring gears encircling the chuck, and a plurality of epicyclic gear trains in said chuck body having separate input gears driven by said ring gears and effecting a differential gear reduction, each of said gear trains being related to a separate spindle rotatably mounted in fixed bearings in the chuck body and having an output gear driving said ring member.

5. In a power chuck of the class described, the combination with a chuck body, a plurality of circumferentially spaced radially movable jaws supported by said body, and a cam ring or scroll member carried by and rotatable relative to the chuck body and interconnected with said jaws to effect radial movement of the latter by reason of said rotation, of a power drive for said ring member comprising a pair of ring gears encircling the chuck, a plurality of epicyclic gear trains in said chuck body and having separate input gears driven by said ring gears to effect a differential gear reduction resulting from a difference in the number of teeth in corresponding gears, each of said gear trains related to a separate spindle rotatably mounted in fixed bearings in the chuck body and having an output gear driving said ring member, means for driving said ring gears, and shifting mechanism selectively connecting said driving means to either one or both of said ring gears or disconnecting the same whereby when only one of said ring gears is driven the chuck jaws are given a traverse movement, when both ring gears are driven in the same direction the chuck jaws are given a feed movement, and when the drive is disconnected from the ring gears the entire chuck is free to rotate as a body.

6. In a power chuck of the class described, the combination with a chuck body, a plurality of circumferentially spaced radially movable jaws supported by said body, and a cam ring or scroll member carried by and rotatable relative to the chuck body and interconnected with said jaws to effect radial movement of the latter by reason of said rotation, of a power drive for said ring member comprising a pair of ring gears encircling the chuck, a plurality of epicyclic gear trains in said chuck body and having separate input gears driven by said ring gears to effect a differential gear reduction, each of said gear trains being related to a separate spindle rotatably mounted in fixed bearings in the chuck body and having an output gear driving said ring member, a motor for driving said ring gears, shifting mechanism selectively connecting said motor to either one or both of said ring gears or disconnecting the same, said motor being reversible to provide for opening and closing of the chuck, and said shifting mechanism having means to hold one ring gear against turning when the motor is connected to drive only the other ring gear whereby traverse movement of the chuck jaws is obtained.

7. In a chuck of the class described, the combination of a chuck body, a plurality of circumferentially spaced radially movable jaws carried by the body, a ring member carried by the body for free rotation thereon and having a scroll interlocking with said jaws for moving the same in chucking operations, a source of reversible rotary power independent of said chuck, shifting mechanism selectively connecting or disconnecting said power source to said ring member to operate said chuck, and a differential gear train interposed in the connection of said power source to said ring member and providing high and low gear reduction rates selectively driving said ring member at a low rate to effect power gripping or release of the workpiece by said jaws and at a high rate to effect rapid traverse opening and closing of the jaws respectively, said differential gear train comprising a spindle journaled in said chuck body and geared at one end to said scroll member, a plurality of axially spaced gears loosely mounted for rotation upon said spindle, at least one radially disposed intermediate gear meshing with said axially spaced gears driven thereby and rigidly carried by said spindle rotating the latter upon translation of said intermediate gear about the same, and separate gears selectively driving said axially spaced gears and providing the selective high and low traverse and feed rates.

8. In combination, a plurality of chucks disposed to operate upon a single workpiece in predetermined relation to each other, each chuck having a plurality of jaws operated by a rotary cam ring, a plurality of spindles rotatably mounted in fixed bearings in each chuck body and geared to the corresponding cam ring, said spindles being spaced apart circumferentially of the corresponding chuck body, a separate epicyclic gear train driving each of said spindles, a common differential drive for the epicyclic gear trains of each chuck, a separate power means for reversibly operating each said differential drive, a common control means for energizing said power means, a separate power shift mechanism disposed to connect each power means to its corresponding chuck and provide traverse and power feed operation of the chucks and to hold said power means normally disconnected from the respective chucks for free rotation of the latter, and a single shift lever actuating said separate shift mechanism.

9. In combination, a plurality of chucks disposed in alinement to operate upon a common workpiece in predetermined relation, each chuck having a plurality of jaws operated by a rotary cam ring, a separate power means for reversibly operating each chuck, a separate power speed change mechanism for each chuck transmitting different selective rates of speed to the cam ring of the corresponding chuck and to disconnect said power means from the respective chucks for free rotation of the latter, and a common control for the chucks comprising means to energize said separate power means in predetermined relation, means to shift said speed change mechanisms to select corresponding speeds for said cam rings, and a single shift lever actuating said energizing means and speed change mechanisms for all of the chucks, said speed change mechanism for each chuck comprising a plurality of separate epicyclic gear trains mounted in relation to corresponding spindles rotatable in fixed bearings in the corresponding chuck body.

10. In combination, a plurality of chucks disposed in alinement to operate upon a common workpiece simultaneously, each chuck having a plurality of radially movable jaws operated by a rotary ring member, a reversible rotary hydraulic motor for operating each chuck, means connecting and disconnecting each of said motors with its corresponding chuck, speed change mechanism in each chuck to effect rotation of the corresponding ring member at selected speeds and power ratios, a reciprocating hydraulic motor for operating said means and said speed change mechanism, a source of fluid pressure for driving said motors, and a manually operable valve controlling the supply of pressure fluid from said source to said motors, said speed change mechanism for each chuck comprising a pair of selectively driven ring gears encircling the chuck, a plurality of circumferentially spaced epicyclic gear trains within the chuck and each having a spindle journaled in the chuck body, an output gear secured to said spindle and driving said rotary ring member, a pair of input gears spaced axially of said spindle and mounted for free rotation thereon and driven in opposite directions selectively by said ring gears, and an intermediate gear meshing with said axially spaced gears and having its journal pin disposed radially of said spindle and secured thereto transmitting translatory movement of the intermediate gear to said spindle rotating the latter.

11. In a chuck of the class described, a chuck body having a plurality of radially movable jaws on the face thereof, a rotary cam ring or scroll member connected to said jaws to move the same radially, a non-translating pinion gear carried by said chuck body and meshing with a ring gear carried by said ring member to drive the latter, an epicyclic differential gear train carried by said chuck body with the non-translating gears thereof eccentric to the axis of the chuck and disposed between said chuck axis and the outer periphery of the chuck, said gear train driving said first named gear, and means for driving said gear train.

12. In a chuck of the class described, a chuck body having a plurality of radially movable jaws on the face thereof, a rotary cam ring or scroll member connected to said jaws to move the same radially, a non-translating pinion gear carried by said chuck body and meshing with a ring gear carried by said ring member to drive the latter, an epicyclic differential gear train carried by said chuck body with the non-translating gears thereof eccentric to the axis of the chuck and disposed between said chuck axis and the outer periphery of the chuck, said gear train driving said first named gear, and a source of power external to the chuck and adapted to be connected thereto at will to drive said gear train.

13. In a chuck of the class described, a chuck body having a plurality of radially movable jaws on the face thereof, a rotary cam ring or scroll member connected to said jaws to move the same radially, a non-translating pinion gear carried by said chuck body and meshing with a ring gear carried by said ring member to drive the latter, an epicyclic differential gear train carried by said chuck body with the non-translating gears thereof eccentric to the axis of the chuck and disposed between said chuck axis and the outer periphery of the chuck, said gear train driving said first named gear, a source of power external to the chuck and adapted to be connected thereto at will to drive said gear train, and means disposed to vary the differential reduction of said epicyclic gear train selectively to drive said first named gear and thereby obtain traverse and power movement of the jaws.

LORENZ ALBERT LEIFER.

REFERENCES CITED

The following references are of record in the file of this patent:

UNITED STATES PATENTS

| Number | Name | Date |
|---|---|---|
| 1,010,054 | Irish | Nov. 28, 1911 |
| 1,364,053 | Quintin | Dec. 28, 1920 |
| 1,389,731 | Barker | Sept. 6, 1921 |
| 1,441,803 | Hay | Jan. 9, 1923 |
| 1,509,510 | Hanna | Sept. 22, 1924 |
| 1,565,733 | Godfriaux | Dec. 15, 1925 |
| 1,699,359 | Hay | Jan. 15, 1929 |
| 1,713,801 | Whiton | May 21, 1929 |
| 1,772,203 | Bush | Aug. 5, 1930 |
| 2,358,049 | Bogart | Sept. 12, 1944 |
| 2,372,592 | Lovely | Mar. 27, 1945 |
| 2,423,244 | Lovely | July 1, 1947 |

FOREIGN PATENTS

| Number | Country | Date |
|---|---|---|
| 20,202 | Great Britain | Sept. 25, 1914 |
| 575,507 | France | Apr. 23, 1924 |